Figure 1:
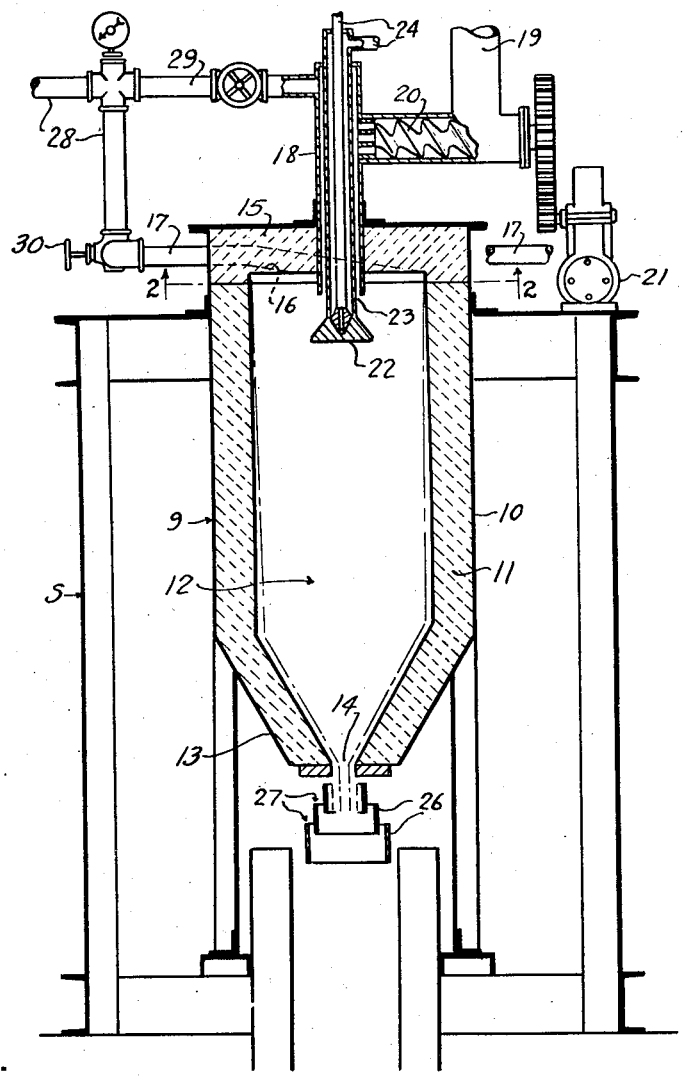

Dec. 7, 1948.   G. SLAYTER   2,455,908
METHOD OF MAKING GLASS FIBERS

Original Filed April 15, 1944

INVENTOR.
Games Slayter

BY Staelin & Overman
ATTORNEYS

Patented Dec. 7, 1948

2,455,908

UNITED STATES PATENT OFFICE 2,455,908

METHOD OF MAKING GLASS FIBERS

Games Slayter, Newark, Ohio, assignor to Owens-Corning Fiberglas Corporation, a corporation of Delaware.

Original application April 15, 1944, Serial No. 531,219. Divided and this application June 5, 1946, Serial No. 674,585.

6 Claims. (Cl. 49—77.5)

This invention relates to an improved method for melting glass and forming fibers therefrom.

This application is a division of my copending application, Serial No. 531,219, filed, April 15, 1944.

One generally accepted practice of melting glass is to provide a large capacity tank divided into a melting chamber and a refining chamber by a partition or bridge wall apertured to enable molten glass to flow from the melting chamber to the refining chamber. As molten glass is withdrawn from the refining chamber, glass batch is added to the melting chamber so that the process of melting and refining the glass is more or less continuous.

The foregoing practice relies principally upon the force of gravity to separate the gas bubbles from the body of molten glass and upon diffusion to obtain uniformity and homogeneity of the molten glass. Since the viscosity of molten glass is relatively high, it follows that the refining process is accomplished at a very slow rate. In fact, the rate of refining the glass is so slow in most cases that considerable quantities of glass must be maintained in a molten state for long periods of time in order to insure an ample supply of refined glass for even a small continuous requirement. This, of course, is objectionable, not only because of the large storage capacity required for the refined glass, but also because of the high heat losses resulting from maintaining the glass continually in a molten state well above the devitrification point.

An improved glass melting technique includes rapidly melting and mixing minutely divided glass batch materials, refining the material and quickly removing it for fabrication while in a molten state and while it still retains a great amount of the melting heat. This process, it will be noted, makes unnecessary the maintenance of a large body of glass which must be held at a high temperature until used. The temperature required for melting the batch is relatively higher than that needed to maintain the glass in a molten state and it follows that where it is possible to employ the glass immediately the advantage of the melting heat even though somewhat reduced may be realized and no additional heat will be required.

With the above in view it is the primary object of the present invention to provide a glass melter into which dry batch materials may be continuously fed and substantially instantaneously reduced to a molten and refined state.

It is a further object of the invention to suspend the particles of batch in a gaseous medium and heat the particles while thus suspended to melt the batch, thereby facilitating the transfer of heat to the batch, and then collecting the heated and melted batch in a thin film to assure ready egress of gas from the molten material.

Another object of this invention is to maintain a positive pressure within the melter during the melting operation and to discharge the molten glass through a restricted orifice in the melter under the influence of a high velocity "sting-out" or the products of combustion escaping through the orifice. As a result, the molten glass is discharged in a continuous stream from the melter as soon as the batch reaches a fluid state.

Still another object of this invention is to provide a melter wherein the glass batch is introduced into the melter through the top of the latter and wherein provision is made to maintain a pressure on the incoming batch which is at least as great as the pressure within the melter so that escape of the products of combustion upwardly through the batch is prevented.

A further object of this invention is to provide a melter in the form of a refractory lined hollow body having means for producing a swirling flame in the body and also having means for directing the incoming batch into the flame. The construction is such that the finely divided particles of the glass batch are rapidly brought up to melting temperature in the swirling flame and are deposited on the heated wall of the melter where they combine with other particles in a molten state to form a fluid mixture of glass.

A still further feature of this invention is to provide a melter of the above character wherein the molten glass collects on the side of the melter and flows downwardly over the heated refractory lining into the high velocity stream of the products of combustion escaping through the restricted discharge orifice at the bottom of the body or chamber. As the molten glass flows downwardly along the hot walls of the chamber it may well be in the form of a continuous sheet and as it becomes more viscous may divide into a number of streams. The streams may recombine and mix with other streams flowing down the wall which reacts to cause a refining of the glass by liberating such gases as are formed or entrapped during the melting.

The refractory materials from which furnace wall blocks are made are subject to chemical attack and erosion by the glass particularly in the melting zone where an extremely high degree of heat is employed. An important advantage of the present type melter lies in the fact that the type of construction is substantially less expensive to manufacture or replace than the usual glass melting furnace.

Still another object of this invention is to employ the high velocity stream of the products of combustion escaping through the discharge orifice for the purpose of blowing the molten glass issuing from the orifice to form glass wool. In this application of the invention it is desirable to insure maintaining the glass issuing from the discharge orifice in the stream of the products of combustion escaping through the orifice, and it is a further object of the invention to accomplish this result by surrounding the molten glass with atmosphere under sufficient pressure to counteract any tendency for the blast to spread or deflect the molten glass out of the stream as it leaves the discharge orifice.

A further application of the present melter may include the use of a trough disposed beneath the discharge orifice to receive glass flowing therefrom and convey it in a continuous stream to suitable fiber forming apparatus. Heat from the "sting-out" maintains the glass in a flowable condition.

Figure 2:
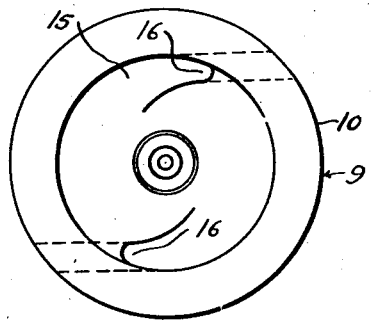

The foregoing, as well as other objects, will be made more apparent as this description proceeds, especially when considered in connection with the accompanying drawings, wherein:

Figure 1 is a semi-diagrammatic side elevational view partly in section of an improved glass melting furnace embodying the present invention; and Figure 2 is a cross-sectional view taken on the plane indicated by the line 2—2 of Figure 1.

In general, the present invention embodies principles adapted for rapidly converting premixed glass batch materials, cullet or the like to molten glass. An increased rate of melting and refining may be obtained by introducing the batch continuously into a heated chamber in relatively small amounts which readily combine to produce a complete glass composition. The molten glass issuing from the melter is free of stones or particles of unmelted batch and is in a substantially refined condition. This condition is obtained by the manner in which the melting of the batch takes place.

The melting chamber is of vertically disposed cylindrical shape and is preferably lined with refractory material or a metal which is non-reactive to the glass batch as will be described in detail presently. Oil, gas or other fuel in the form of premixed fuel and air is introduced tangentially to the axis into the top of the chamber, either from one or opposite sides thereof. The melter forms the combustion chamber for the gas mixture which expands upon contact with the heated walls with considerable turbulence and thereby develops a high velocity. This velocity is greatly increased by the reduced size of the discharge orifice at the bottom of the melter which results in the building up of pressure therein. The flow of the products of combustion is generally in a spiral or cyclonic manner along the chamber wall and when batch is introduced into or near the vortex formed by the flames it is thrown with great force onto the wall.

The temperature within the chamber is sufficiently high to substantially instantaneously melt the fine batch which moves by gravity and the influence of the flame down the chamber wall. The glass forms a thin coating on the wall just below the burner openings near the top of the chamber and is in a fluid state so that it flows readily along the wall. The adhesion of the glass to the wall retards the movement of the portion of the glass film in contact therewith so that there is relative movement between the inner and outer "surfaces" of the film.

The volume of glass discharged from the melter is governed in part by the rate at which batch is fed thereto and which in turn is limited to the rate at which the batch can be reduced to a molten state.

The surface of the glass exposed to the flame has a slightly higher temperature and is more fluid than the glass nearer the wall. This "slipping" of the glass becomes a mixing or stirring action by means of which seeds or gas bubbles formed by the melting batch are liberated and increases in magnitude as the volume of glass increases. The continued flow of glass down the chamber wall provides additional planing or fining action and as the volume of glass increases due to the gradual lowering of temperature, the entire body becomes a relatively homogeneous mass. The degree of homogeneity obtained is a result of inertness of the wall material to the type of glass batch employed. The molten glass tends to "wash out" the refractory and chemically acquire properties from the wall. This, of course, does not occur where a metallic lining such as, for instance, platinum is used and a relatively higher degree of homogeneity is realized.

One form of apparatus by which the present invention may be accomplished is illustrated in Figure 1 of the drawings wherein I have shown a vertically arranged cylindrical glass melter 9 comprising a sheet metal casing 10. The casing is lined with a refractory material 11 to form a chamber 12 therein and has an inverted frusto conical section 13 at the bottom provided with a restricted discharge opening 14. The melter may be mounted on a suitable frame or supporting structure S. The top of the chamber 12 is closed by a slab 15 of refractory material, shown in Figure 2 of the drawing, and formed with diametrically opposed recesses or pockets 16 for receiving suitable gas burners 17. The burners 17 are directed tangentially of the chamber and co-operate with one another to produce a swirling or cyclonic flame in the chamber, the exhaust gases exiting through the opening 14. The fuel supplied to the burners may be an air-gas mixture previously mixed and fed to the burners under a low pressure. The fuel is ignited within the chamber 12 which serves as a combustion chamber for the burners so that a high degree of heat is developed for melting the batch. The burning gases expand within the chamber and produce a high velocity "sting-out" flame which may be employed directly to form fibers from the molten glass produced by the melter or for heating a conditioning chamber for the glass.

However, for the purpose of illustration, the glass batch is shown in Figure 1 of the drawing as fed into the chamber 12 through a chute 18 coaxially arranged with respect to the chamber and communicating at a point above the chamber with a hopper 19 containing a vertical column of the batch. The batch is transferred from the hopper 19 to the chute 18 through a tubular casing having a feed screw 20 suitably rotatably supported therein and driven by an electric motor 21.

As the glass batch is discharged into the chamber 12 from the lower end of the chute 18, the finely divided particles are immediately impinged by the swirling flame and reduced to a molten state in which condition they are deposited on the wall of the chamber by the centrifugal force created by the flame. The foregoing is accomplished by providing a distributor 22 supported at the discharge end of the chute 18 in axial alignment with the latter and having a conical surface for uniformly spreading the particles of the batch outwardly into the swirling flame. The distributor 22 is formed with a jacket 23 communicating with a pair of tubes 24 which extend upwardly through the chute 18 to a suitable source (not shown) of coolant. As a result, coolant is circulated through the distributor 22 during operation of the melter and damaging of the distributor by the heat generated in the melter is avoided.

The above construction is such that glass melted in the chamber 12 by the swirling flame collects on the side walls of the chamber and flows downwardly along the walls to the discharge orifice 14 at the bottom of the chamber. As stated above, the inner surfaces of the chamber walls are formed of a refractory material and are, of course, maintained at a high temperature by the flame so that the glass is refined in the manner previously disclosed as it flows to the discharge orifice 14.

It will also be observed from the foregoing that the products of combustion escape from the interior of the chamber 12 through the same orifice 14 employed to remove the molten glass from the chamber. This orifice 14 is restricted to such an extent that a positive pressure is maintained in the chamber and, as a result, the products of combustion escape through the orifice 14 at a relatively high velocity. The above feature is advantageous because it materially accelerates removal of molten glass from the chamber and the escaping gases are employed for forming the glass into fibers.

In Figure 1 of the drawings, however, the blast or high velocity stream of the products of combustion is employed to attenuate the molten glass escaping through the orifice and form glass wool. One difficulty encountered in forming glass fibers directly from molten glass issuing from the orifice 14 is to maintain the glass within the effective region of the blast of the products of combustion escaping through the same orifice. The molten glass has a tendency to spread outwardly away from the blast at the discharge side of the orifice since the glass completely surrounds the blast in substantially tube-like form. This tendency may be overcome by producing sufficient pressure around the glass, as it issues from the orifice 14, to maintain the molten glass in effective intimate contact with the blast. One means of accomplishing the above results is to arrange a plurality of axially aligned relatively short tubes 26 at the discharge side of the orifice in concentric relation to the blast of the products of combustion flowing through the orifice 14. The tubes successively increase in diameter in the direction of the flow of the products of combustion and cooperate to form annular spaces 27 through which air flows in the directions shown in response to the passage of the products of combustion through the tubes 26. This flow of air creates sufficient pressure around the blast to concentrate the molten glass in the blast and thereby facilitates attenuation of the molten glass into fibers.

It will be understood from the foregoing that some arrangement must be made to prevent the escape of the products of combustion upwardly through the chute 18. In general, the above is accomplished by providing a pressure in the chute above the batch supplied to the chute by the feed screw 20 which is at least as great as the pressure within the chamber 12. In detail, the fuel supply conduit 28 for the burners 17 communicates with the upper end of the chute 18 by means of a branch conduit 29 so that the pressure at the top of the material in the chute 18 is substantially the same as the pressure produced in the chamber 12 by the products of combustion from the burners 17. Suitable valves 30 and 31 may be, respectively, incorporated in the conduits 28 and 29 in positions to enable independently varying the fuel under pressure supplied to the chute and chamber 12. The escape of products of combustion through the batch in the feeding screw casing 20 is prevented by the height of the column of the batch maintained in the hopper 19. In other words, the height and weight of the column of the batch in the hopper is predetermined to seal the feeding mechanism against escape of the products of combustion from the chamber 12.

Modifications may be resorted to within the spirit of the invention and the scope of the appended claims.

I claim:

1. The method of producing glass wool which consists in continuously melting glass batch materials under pressure in a swirling flame within a confined area, collecting the melted glass in the form of a hollow stream, and fiberizing the molten glass by flowing it through a restricted path around the high velocity stream of the products of combustion escaping from the confined path.

2. The method of producing glass wool which consists in melting glass batch materials under pressure in a substantially cylindrical confined melting zone having a restricted discharge path defining the lower end of said zone and leading therefrom, bringing the batch into contact with a swirling flame in the upper end of the confined zone to reduce it to a molten state, flowing the molten glass around the high velocity stream of the products of combustion escaping said zone through the discharge path to fiberize the molten glass issuing from the path, and inducing an inwardly directed movement of air around the molten glass issuing from the discharge path by movement of the blast of the products of combustion passing through the path to urge the molten glass into the blast.

3. The method of manufacturing glass wool which consists in producing a swirling flame in a substantially closed melting zone having a restricted discharge path at the bottom through which the products of combustion escape at a high velocity, continuously feeding glass batch materials in fine particles into the upper end of the zone and directing the batch into the swirling flame to melt the batch, collecting the melted glass along the periphery of the zone, flowing the molten glass around the high velocity stream of the products of combustion escaping the zone through the discharge path to fiberize the molten glass issuing from said path, and maintaining a fluid pressure on the incoming batch at least as great as the pressure built up in the melting zone by the products of combustion.

4. The method of producing glass fibers which consists in continuously feeding glass batch materials under pressure into a confined melting zone having a restricted discharge path leading therefrom, bringing the batch into contact with a swirling plane in the confined zone to melt the batch, flowing the melted glass along the periphery of the zone toward said discharge path in the form of a cylindrical stream, and engaging the stream from the inside with the high velocity products of combustion of said flame as it flows from the discharge path to form said glass into fibers.

5. The method of producing glass fibers which consists in continuously feeding granular glass batch materials under pressure into a confined melting zone having a restricted discharge path leading therefrom, melting the batch to form a stream thereof by bringing the granules into contact with a swirling spirally directed flame moving in the direction of the restricted path, collecting the melted glass in the form of a tubular stream, flowing said stream through said restricted path, and simultaneously engaging the stream along its inner surface with the blast of the products of combustion of said flame to form said glass into fibers.

6. The method of producing glass fibers which consists in providing a high velocity swirling flame in a confined melting zone having a restricted discharge path therein, feeding batch materials under pressure into the vortex of said flame to melt the batch to glass, collecting the glass into a hollow stream as it flows toward said discharge path, and discharging the swirling products of combustion of said flame and said hollow stream simultaneously from said melting zone to form said glass into fibers.

GAMES SLAYTER.

REFERENCES CITED

The following references are of record in the file of this patent:

UNITED STATES PATENTS

| Number | Name | Date |
|---|---|---|
| 779,307 | Parkison | Jan. 3, 1905 |
| 2,165,242 | Drill | July 11, 1939 |